United States Patent [19]

Nungaray

[11] Patent Number: 5,051,174

[45] Date of Patent: Sep. 24, 1991

[54] BAR SCREEN RAKE APPARATUS

[75] Inventor: Patrick G. Nungaray, Baytown, Tex.

[73] Assignee: G-H Systems, Inc., La Porte, Tex.

[21] Appl. No.: 412,118

[22] Filed: Sep. 25, 1989

[51] Int. Cl.$^5$ .............................................. B01D 35/02
[52] U.S. Cl. .................................... 210/159; 210/162;
210/415
[58] Field of Search ......................... 210/159, 162, 415

[56] References Cited

U.S. PATENT DOCUMENTS 4,917,796  4/1990  Rudzinski ............................ 210/159

FOREIGN PATENT DOCUMENTS 87062  5/1869  Fed. Rep. of Germany ...... 210/159
2310970  5/1975  France ................................. 210/159

Primary Examiner—W. Gary Jones
Assistant Examiner—Matthew O. Savage
Attorney, Agent, or Firm—Daniel V. Thompson

[57] ABSTRACT

A bar screen assembly includes a bar rack interposed across a passageway. At least one rake arm for raking debris from the bar rack to an upper end of the bar rack is provided. An apron adjacent the upper end of the bar rack receives debris, and the apron is mounted to the frame for movement between a receiving position and a dumping position. A mechanism is provided to sense movement of the rake arm relative the upper end of the bar rack, and a mechanism is provided for moving the apron from the receiving position to the dumping position in response to the sensing mechanism.

10 Claims, 3 Drawing Sheets

FIG. I

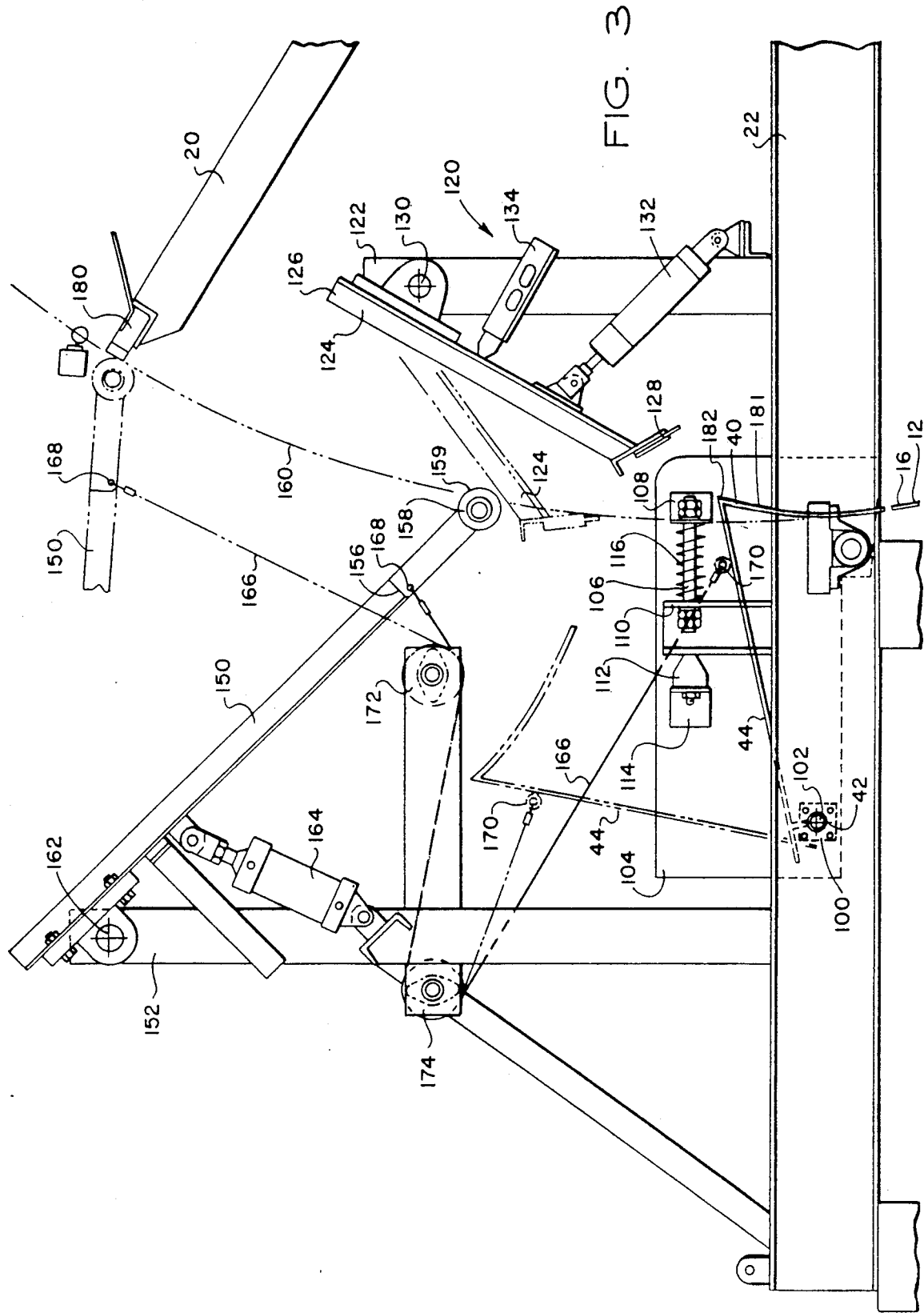

BAR SCREEN RAKE APPARATUS

TECHNICAL FIELD

The present invention relates to wastewater treatment, and more particularly to an improved rake apparatus for a bar screen.

BACKGROUND OF THE INVENTION

Bar screens have long been used in wastewater treatment plants ahead of pumps, meters, grit systems, clarifiers and the like to prevent logs, timber or other heavy objects from entering the plant. The conventional bar screen includes a rake for mechanically cleaning the screen, with an inclined apron at the top of the screen being provided to receive debris from the rake. The conventional inclined apron is fixed, and of necessity is at a relatively high elevation with respect to the water flow elevation.

A drawback of the conventional fixed discharge apron is that elevation in the plant is wasted, which requires greater head room as well as inefficient utilization of the bar screen. Thus, there presently exists a need for a bar screen rake apparatus which would enable the discharge to be closer to the floor level of the plant as well as permit a greater percentage of the bar rack to be located in the water flow passageway.

SUMMARY OF THE INVENTION

The present invention presents a solution to the above-described drawback by providing a pivotable apron adjacent the upper end of the bar rack, with the apron being mounted to a frame for movements between a receiving position and a dumping position. The movement of the rake arm relative the upper end of the bar rack is sensed, and the apron is thereby actuated to pivot from the receiving position to the dumping position in response to the movement of the rake arm past the upper end of the bar rack. In a preferred embodiment, the bar rack is semicylindrical and includes at least two rake arms radially mounted for rotation about an arm axis. The apron is pivotally mounted to the frame for movements about an apron axis which is parallel to and located at approximately the same level as that of the arm axis. The apron includes a substantially planar apron surface, with the apron surface in the receiving position being substantially horizontal, and the apron surface in the dumping position being substantially vertical The apron is pivoted by a cable mounted to the apron at a location spaced from the apron axis. The movement of the rake arm relative the upper end of the bar rack is sensed by a sensing boom pivotally mounted to the base and having a contact portion for contacting and sensing the location of the rake arm. A cable extends between the boom and the apron by way of a system of pulleys for actuating the apron.

BRIEF DESCRIPTION OF THE DRAWINGS

A more complete understanding of the invention and its advantages will be apparent from the Detailed Description taken in conjunction with the accompanying Drawings in which:

FIG. 3 is an enlarged partially broken-away view of the improved rake apparatus of FIGS. 1 and 2.

DETAILED DESCRIPTION OF THE PREFERRED EMBODIMENT

Figure 1:
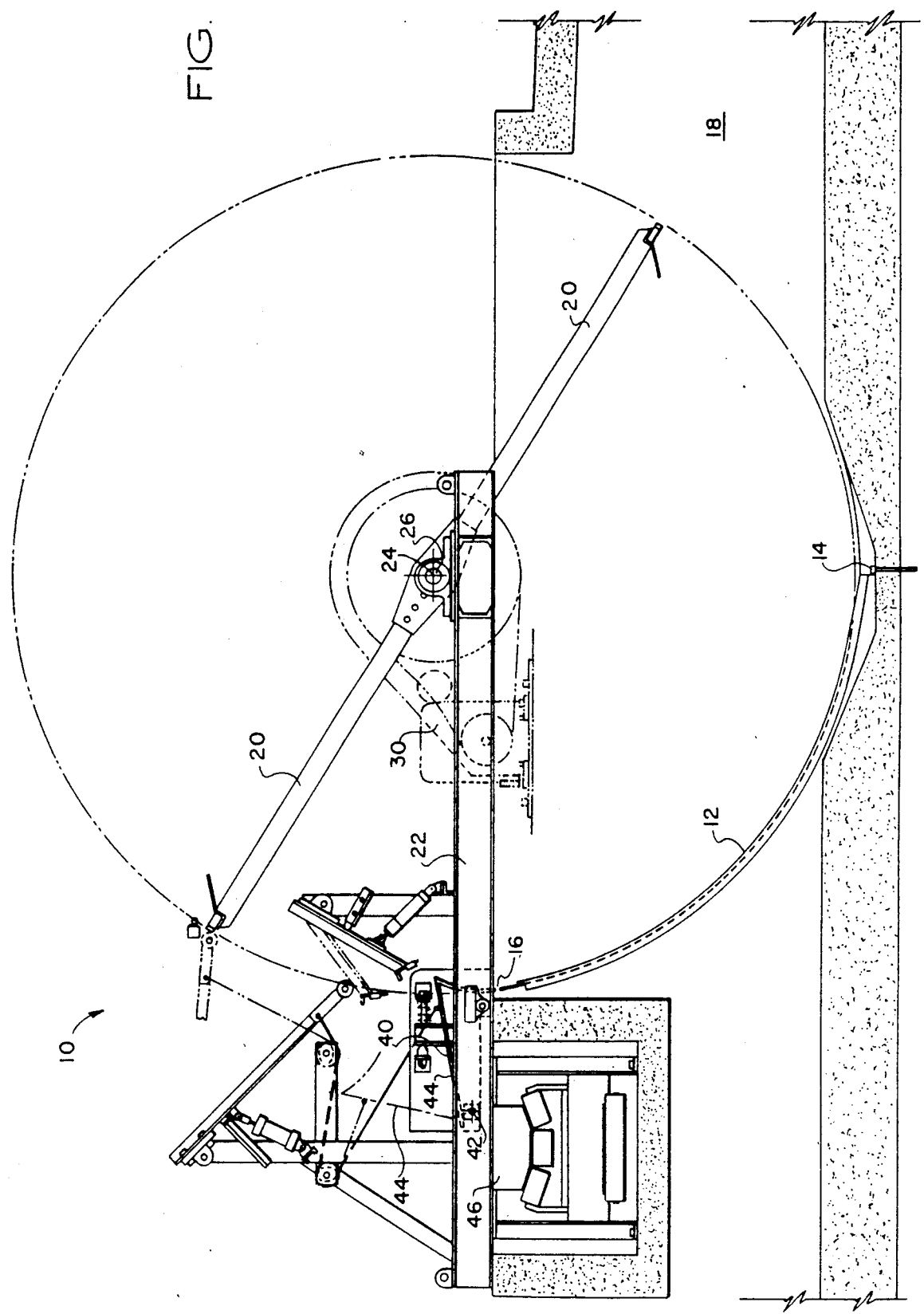
FIG. 1 is a schematic partially broken-away elevation view of a bar screen including the improved rake apparatus.
Figure 2:
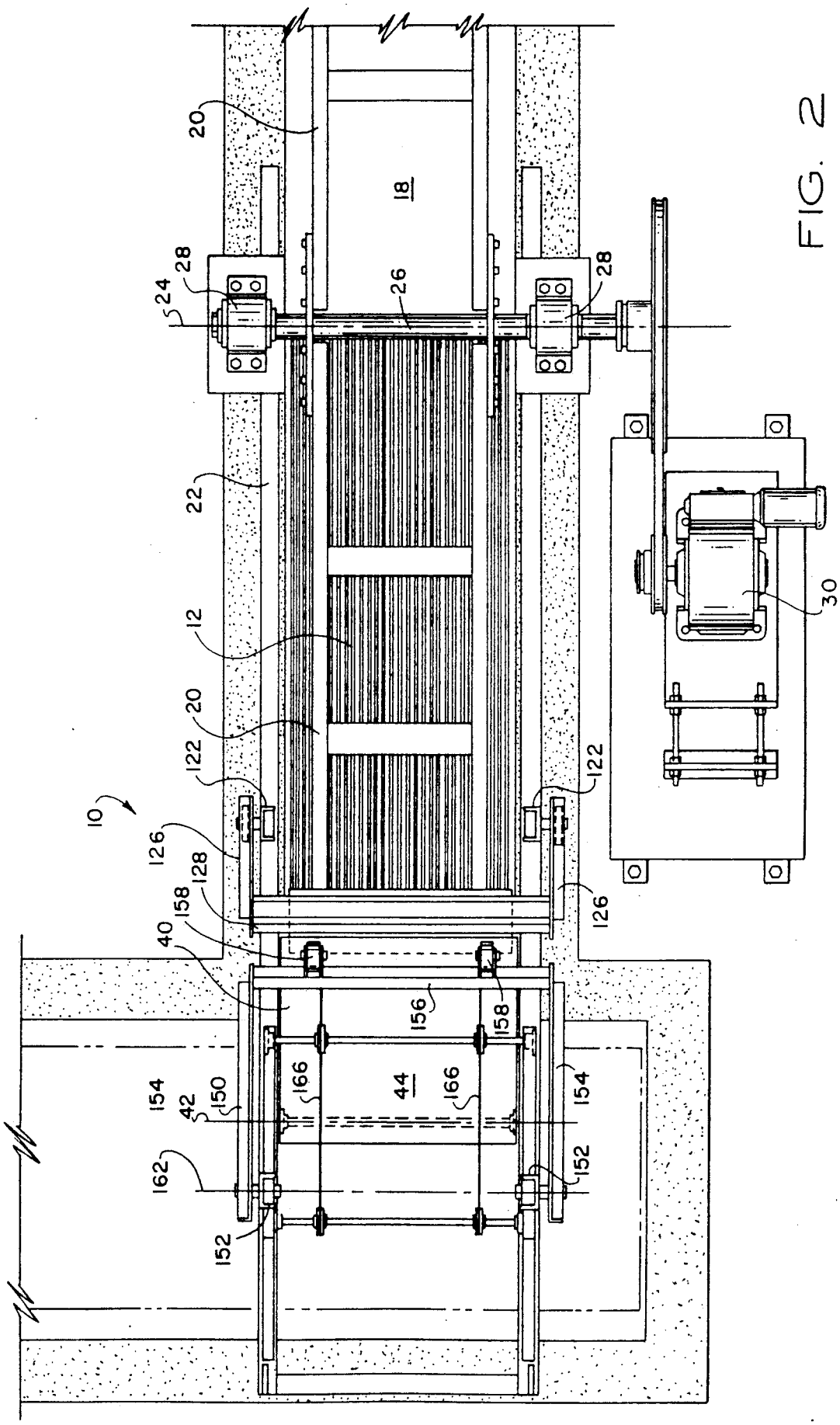
FIG. 2 is a partial schematic plan view of the bar screen of FIG. 1.

Referring initially to FIGS. 1 and 2, bar screen 10 includes a bar rack 12 mounted at a lower end 14 and an upper end 16 across a water flow passageway 18. Bar rack 12 is semicylindrical Two rake arms 20 are radially mounted to base or frame 22 for rotation about an arm axis 24. Arms 20 are mounted to shaft 26, which in turn is mounted in bearings 28 attached to base 22. A drive assembly 30 is provided for controlled rotation of rake arms 20.

An apron 40 is located adjacent upper end 16 of bar rack 12 for receiving debris. Apron 40 is pivotally mounted to base 22 for movements about an apron axis 42 parallel to and located at approximately the same level as that of arm axis 24. As best shown in FIG. 1, apron 40 includes an apron surface 44 which is substantially horizontal in a receiving position shown in solid lines and is substantially vertical in a dumping position shown in dotted lines. A belt conveyer 46 is provided to receive debris from the apron when it is located in the dumping position.

Referring now to FIG. 3, in addition to FIGS. 1 and 2, apron 40 is connected to frame 22 by way of bearings 100, shaft 102 and plates 104. Bearings 100 are fixed to plates 104, which in turn are slidingly mounted to frame 22 by way of a rods 106 spanning between angles 108 and upstanding arms 110 connected to frame 22. Rubber bumpers 112 are connected to angles 114 and contacts upstanding arms 110. Springs 116 are provided to bias plates 104 with respect to upstanding arms 110.

Rake scraper assembly 120 includes upstanding arms 122 connected to frame 22. Scraper 124 is a generally U-shaped construction, as best shown in FIG. 2, including lateral members 126 and blade 128 spanning between lateral members 126. Scraper 124 is pivotally mounted to upstanding arms 122 for movements about scraper axis 130. A shock absorber 132 and rubber bumper 134 are provided to control return movements of the scraper 124.

The movement of rake arms 20 relative to upper end 16 of bar rack 12 is sensed by sensing boom 150 which is pivotally mounted to upstanding arms 152. Boom 150 includes lateral members 154 and a cross member 156. Rollers 158 have contact portions 159 extending outwardly from cross member 156 to a location intersecting the arc travelled by rake arms 20 illustrated by line 160. Boom 150 is pivotally mounted to upstanding arms 152 for pivoting movements about sensing arm axis 162 parallel to apron axis 142. A shock absorber 164 is provided to control return movements of sensing boom 150. A pair of actuating cables 166 extend between mounting locations 168 on sensing boom 150 remote from sensing arm axis 162 and mounting locations 170 on apron 40 remote from apron axis 42. Pulleys 172 and 174 route cables 166 in the desired pathways.

In operation, rake arms 20 are rotated about rake axis 24 by drive assembly 30. Debris is scraped upwardly from bar rack 12 by the ends 180 of rake arms 20. As ends 180 approach and contact deflector surface 181 of apron 40, apron 40 and plates 104 are pushed against the bias of springs 116, thereby insuring that no debris falls back into the water flow passageway 18 as the rake arm 20 approaches and passes the horizontal position. Once end 180 clears the upper edge 182 of apron 40, the apron 40 and plates 104 snap back toward the rake arm 20, such that any debris removed from the rake arm 20 will fall upon the substantially horizontal apron surface 44. Next, the rake arm 20 engages scraper blade 128, and scraper 124 pivots upwardly and outwardly to the position shown in dotted lines in FIG. 3. As the scraper 124 pivots, all debris is cleared from the rake arm 20 by blade 128 and falls upon the substantially horizontal planar apron surface 44 in its receiving position, shown in solid lines in FIG. 3. Lateral members 126 are more widely spaced than ends 180 of rake arms 20, so once scraper blade 128 clears end 180, the scraper 124 returns to its static position shown in solid lines in FIG. 3. Next, the movement of rake arm 20 past upper end 16 of bar rack 12 is sensed by contact between ends 180 and contact surfaces 159 of rollers 158. Sensing boom 150 is lifted upwardly by end 180, thereby tensioning actuating cables 166. Actuating cables 166 are routed such that as sensing boom 150 attains the position shown in dotted lines in FIG. 3, planar apron surface 44 becomes substantially vertical and apron 40 is in the dumping position, shown in dotted lines in FIG. 3. All debris deposited upon the apron 40 has then been transferred by gravity to the belt conveyer 46. Once contact surfaces 159 of rollers 158 clear ends 180 of rake arms 20, the sensing boom 150 returns to its static position, shown in solid lines in FIG. 3.

Whereas the present invention has been described with respect to a specific embodiment thereof, it will be understood that various changes and modifications will be suggested to one skilled in the art and it is intended to encompass such changes and modifications as fall within the scope of the appended claims.

I claim:

1. In a bar screen assembly having a bar rack mounted to a base interposed across a passageway and further having at least one rake arm mounted for rotation about an arm axis for raking debris from the bar rack to an upper end of the bar rack, the improvement comprising:
    an apron adjacent and in close proximity to the upper end of the bar rack for receiving debris, said apron being pivotally mounted to the base for movements about an apron axis between a receiving position and a dumping position the apron axis being at approximately the same level as the arm axis;
    sensing means for sensing movement of the rake arm relative the upper end of the bar rack; and,
    actuation means for moving said apron from said receiving position to said dumping position in response to said sensing means.

2. The assembly of claim 1 wherein the bar rack is semi-cylindrical and includes at least two rake arms radially mounted to the base for rotation about the arm axis.

3. The assembly of claim 2 wherein said apron axis is parallel to the arm axis.

4. The assembly of claim 1 wherein said apron includes a substantially planar apron surface, with said apron surface in said receiving position being substantially horizontal, and said apron surface in said dumping position being substantially vertical.

5. The assembly of claim 4 wherein said actuation means includes force means mounted to said apron at a mounting location spaced from said apron axis for pivoting said apron.

6. The assembly of claim 5 wherein said force means includes a cable mounted to said apron at said mounting location.

7. The assembly of claim 4 wherein said sensing means includes a sensing boom pivotally mounted to the base and having a contact portion for contacting and sensing the location of said rake arm.

8. The assembly of claim 7 wherein said actuation means includes a cable extending between said sensing boom and said apron.

9. In a bar screen assembly having a bar rack interposed across a passageway and further having at least one rake arm for raking debris from the bar rack to an upper end of the bar rack, the improvement comprising:
    an apron adjacent the upper end of the bar rack for receiving debris, said apron being mounted to a frame for movements between a receiving position and a dumping position;
    sensing means for sensing movement of the rake arm relative the upper end of the bar rack; situation means for moving said apron from said receiving position to said dumping position in response to said sensing means;
    wherein the bar rack is semi-cylindrical and includes at least two rake arms radially mounted to a shaft for rotation about an arm axis;
    wherein said apron is pivotally mounted to the frame for movements about an apron axis parallel to the arm axis; and
    wherein said apron is pivotally mounted to plates, and said plates are slidingly mounted to said frame.

10. In a bar screen assembly having a semi-cylindrical bar rack interposed across a passageway and further having at least two rake arms radially mounted for rotation about an arm axis, the improvement comprising:
    an apron adjacent and in close proximity to the upper end of the bar rack for receiving debris, said apron being pivotally mounted to a frame for movements about an apron axis that is parallel to and approximately level with the arm axis between receiving and dumping positions;
    said apron including a substantially planar apron surface, with said apron surface in said receiving position being substantially horizontal, and said apron surface in said dumping position being substantially vertical;
    sensing means for sensing movement of the rake arm relative the upper end of the bar rack, said sensing means including a sensing boom pivotally mounted to the frame and having a contact portion for contacting and sensing the location of said rake arm; and,
    actuation means for pivoting said apron from said receiving position to said dumping position in response to said sensing means, said actuation means including a cable mounted to said apron at a mounting location spaced from said apron axis and extending to said sensing boom for pivoting said apron.

* * * * *